United States Patent
Cheung et al.

(10) Patent No.: US 7,265,553 B2
(45) Date of Patent: Sep. 4, 2007

(54) METHOD AND APPARATUS FOR IMAGING EARTH FORMATION

(75) Inventors: Philip Cheung, Clamart Cedex (FR); Andrew Hayman, Clamart Cedex (FR); Dennis Pittman, Clamart Cedex (FR); Richard Bloemenkamp, Clamart Cedex (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/563,900

(22) PCT Filed: Jul. 7, 2004

(86) PCT No.: PCT/EP2004/007486

§ 371 (c)(1),
(2), (4) Date: Apr. 19, 2006

(87) PCT Pub. No.: WO2005/006023

PCT Pub. Date: Jan. 20, 2005

(65) Prior Publication Data

US 2007/0030008 A1    Feb. 8, 2007

(30) Foreign Application Priority Data

Jul. 10, 2003    (GB) ................ 0316165.0

(51) Int. Cl.
*G01V 3/18* (2006.01)

(52) U.S. Cl. ...................... 324/367; 324/374

(58) Field of Classification Search ............. 324/347, 324/355, 366, 367, 374, 375, 373; 702/7, 702/11
See application file for complete search history.

(56) References Cited

U.S. PATENT DOCUMENTS

| | | | | |
|---|---|---|---|---|
| 4,468,623 | A * | 8/1984 | Gianzero et al. | 324/367 |
| 4,567,759 | A * | 2/1986 | Ekstrom et al. | 73/152.02 |
| 5,502,686 | A * | 3/1996 | Dory et al. | 367/34 |
| 6,191,588 | B1* | 2/2001 | Chen | 324/367 |
| 6,891,377 | B2* | 5/2005 | Cheung et al. | 324/374 |
| 2002/0153896 | A1 | 10/2002 | Yuratich et al. | |

OTHER PUBLICATIONS

GB 2 377 996 cited in the UK Search Report, Jan. 2003.
EP 0 426 564 cited in the UK Search Report, May 1991.

* cited by examiner

*Primary Examiner*—Jay M Patidar
(74) *Attorney, Agent, or Firm*—Kevin P. McEnaney; Jaime Castano; James L. Kurka

(57) ABSTRACT

The invention concerns an apparatus for investigating the wall of a borehole tilled with non-conductive mud, said apparatus comprising: a pad having an inside face and an outside face for pressing against the wall of the borehole; a set of measurement electrodes mounted on the outside face of the pad, potentials differences being measured between said measurement electrodes in order to provide measured points representative of the resistivity of the formation; both a source electrode and a return electrode adapted to inject current into the formation, the set of measurement electrodes being situated between the source electrode and the return electrode.

25 Claims, 6 Drawing Sheets

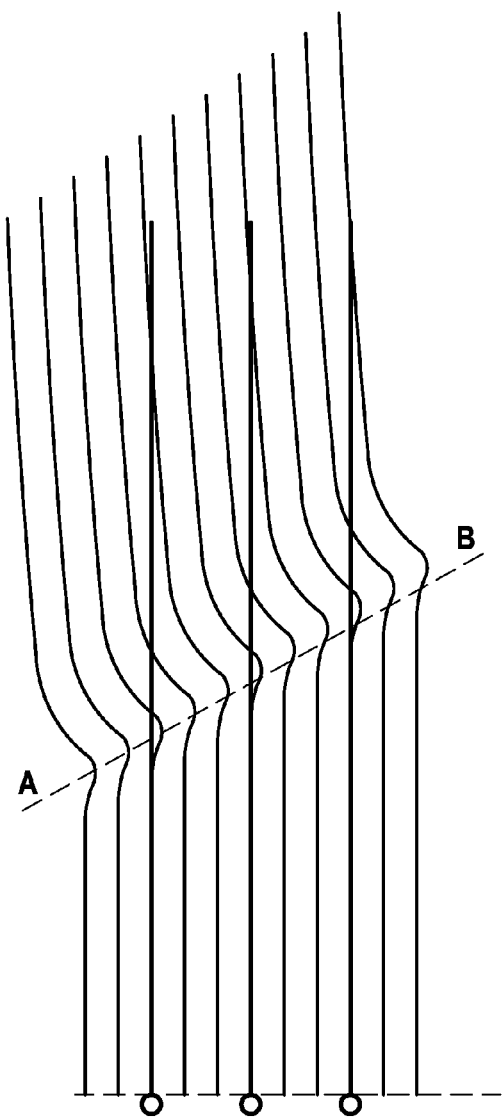
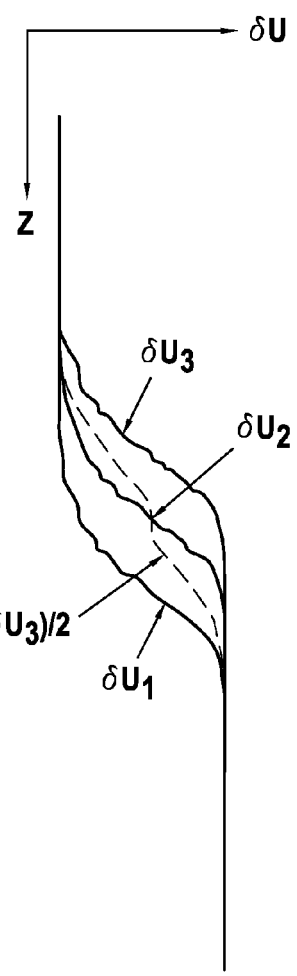
FIG.8
FIG.7

METHOD AND APPARATUS FOR IMAGING EARTH FORMATION

The present invention relates in general terms to the imaging of earth formations. More particularly, the invention relates to an improved arrangement of the matrix of voltage electrodes that lay on the pad that will be pressed against the formation wall in order to investigate the surroundings of the well, and to a method for imaging earth formation with said pad.

In order to explore hydrocarbon deposits, it is highly desirable to obtain accurate knowledge of the characteristics of the geological formation at various depths of the borehole. Many of these characteristics are very fine in structure, e.g. stratifications, non-uniform elements, pore characteristics, fractures, etc. By way of example, the orientations, the density, and the lengths of fractures play a major role in the dynamic characteristics of a reservoir rock. Two types of measurement techniques have been implemented, depending on the type of mud that has been used to drill the well. Some of those techniques, among which patent U.S. Pat. No. 4,567,759, address measurements in conductive mud.

Other techniques address measurements in non-conductive mud, among which patent U.S. Pat. No. 6,191,588. That tool for investigating formation conductivity uses a non-conductive pad and buttons that form voltage electrodes instead of current electrodes as described in document U.S. Pat. No. 4,468,623. The current injection electrodes are situated off the pad, or in a preferred variant, directly at the ends thereof. In any event, the two injectors are placed in such a manner that current passes through the formation substantially parallel to the pad and thus preferably flows substantially orthogonally to the boundaries of the strata. Under such conditions, the potential difference between two buttons is proportional to the resistivity of the material facing the buttons.

As stated in this document, the fact that the current flows substantially normal to the boundaries of the strata is to be considered as an ideal situation. Consequently, a simplified non-conductive pad provided with a single current source and a single current return would be sufficient. In practice, however, such one-dimensional current flow cannot guarantee that the current will always flow substantially normal to the bed boundaries. It is possible that the bed boundaries may be aligned parallel to the current flow, e.g. in a deviated or horizontal well. If this happens, the current flowing through the different beds will not be equal and the voltage differences measured by two pairs of electrodes on opposite sides of a bed boundary will be meaningless. Furthermore, highly resistive streaks are known to occur in earth formations and if such streak lies between the current source and current return, no current field will be generated and no voltage will be detected.

Document U.S. Pat. No. 6,191,588 proposes to provide the tool with a pair of non-parallel current sources and current returns, to measure voltage drop in two directions and to perform a vector analysis. This technique is also coupled with an electrodes arrangement in a matrix having offset rows. In a first example, it is proposed a two-row arrangement and in a second example, a three-row arrangement is disclosed.

However, the size and spacing of the electrode buttons is important to obtain good resolution and signal to noise ratio. In particular, the buttons should be closely spaced for high resolution and small in area for good spatial bandwidth. Therefore, the solutions proposed in U.S. Pat. No. 6,191,588 are not completely satisfying. First, the two-row arrangement in this document suffers from poor vertical resolution considering the vertical packing of the electrodes. Second, the three-row arrangement has an even worse vertical resolution and needs a large number of electrodes, which is practically difficult to implement, since each button needs to be connected to its own high-impedance buffer amplifier.

It is thus an object of the invention to provide an apparatus and method for imaging earth formation in non-conductive mud wells that performs measurements with improved resolution while being simple to practically implement.

To this end, the invention proposes an apparatus for investigating the wall of a borehole filled with non-conductive mud, said apparatus comprising:

- a pad having an inside face and an outside face for pressing against the wall of the borehole;
- a set of measurement electrodes mounted on the outside face of the pad, potentials differences being measured between said measurement electrodes in order to provide measured points representative of the resistivity of the formation;
- both a source electrode and a return electrode adapted to inject current into the formation, the set of measurement electrodes being situated between the source electrode and the return electrode;

According to the invention, the set of measurement electrodes comprises two substantially horizontal rows of electrodes, said two rows being horizontally offset from each other, such that the potential differences measured between said measurement electrodes are representative of both the vertical component and the horizontal component of the total electric field in the formation at each measured point.

The apparatus of the invention thus provides a very satisfying packaging of the set of measurements electrodes, which leads to better image resolution of the formation while being very convenient to implement on the pad.

In a first embodiment of the apparatus of the invention, each measured point is situated at the midpoint of the vertical median line of a triangle constituted by an elementary group of three measurement electrodes among which two of them are from the same row and one of them is from the other row of measurement electrodes.

This embodiment significantly reduces the number of measurements electrodes. Actually, it provides a number of n measured points using only n+2 measurements electrodes while performing n+1 potential differences. The number of measurement electrodes is thus drastically reduced compared to the apparatus known in the prior art that at least require 2n measurement electrodes for n measured points.

In a second embodiment of the apparatus according to the invention, each the measured point is situated at the position of each measurement electrode or each measured point faces each measurement electrode and is vertically offset from said measurement electrode by one half of the vertical offset between said two rows.

These embodiments significantly improve the horizontal resolution of the vertical component.

In a third preferred embodiment of the apparatus of the invention, the measured points are situated at the midpoints of each of the lines joining the measurement electrodes of one row with the adjacent electrodes of the other row.

As for the first embodiment, the number of needed measurement electrodes is also drastically reduced since each measurement electrode participates in the determination of two measured points. This position of the measured point is also very satisfying considering that in this case the vertical and horizontal components of the electric field are obtained at the same point and do not need to be depth shifted with respect to each other.

In an example of an apparatus according to the invention, the pad is made out of non-conductive material. In another example, the pad further comprises shielding means which are arranged between the source electrode and the measurement electrodes and between the measurement electrodes and the return electrode, said shielding means being flush with or almost flush with the outside face of the pad. In this case, it is possible that the pad itself constitutes the shielding means, said pad being made of electrically conductive material.

Preferably, the apparatus of the invention comprises voltage-measuring means coupled to said set of measurement electrodes for measuring said potential differences between said measurement electrodes. It also comprises signal processing means coupled to said set of measurement electrodes for generating a resistivity image of the borehole wall based on potential differences measured by said voltage measuring means. In this case, each measured point constitutes a pixel of the resistivity image of the borehole wall.

It is also an object to propose a method for investigating the wall of a borehole in a geological formation wherein a borehole filled with non-conductive mud passes, the method comprising:

pressing a pad against the borehole wall, said pad comprising a current electrode and a return electrode;

generating a current to flow into the formation via said current electrode and said return electrode between which a potential is applied;

measuring potential differences between measurement electrodes that are situated on the outside face of the pad between the current electrode and the return electrode;

providing from said potential differences a set of measured points that are representative of the resistivity of the borehole wall;

According to the invention, the method further comprises arranging said measurement electrodes in two rows that are substantially horizontal and horizontally offset from each other; deducing from said potentials differences the vertical component and the horizontal component of the electric field in the formation at each measured point; and summing said vertical and horizontal components in order to provide the total electric field in the formation at each measured point.

In a first embodiment, each measured point is situated at the midpoint of the vertical median line of a triangle constituted by an elementary group of three adjacent measurement electrodes among which two of them are from the same row and one of them is from the other row of measurement electrodes.

In this case, the method preferably comprises the steps of calculating the horizontal and vertical components of the electric field generated in each elementary group of three adjacent measurement electrodes; depth shifting the horizontal component of said electric field to the level of the vertical component; summing the said two components vectorial in order to obtain the total electric field in each of said group of three adjacent measurement electrodes.

In a second embodiment, the method further comprises measuring the measurement electrodes potentials of the two rows relative to a reference for a first measurement depth d; repeating the measurement of the measurement electrodes potentials for the two rows at a second and at a third measurement depths, said second and third depths being respectively spaced from the first measurement depth by d+dy and d−dy, wherein dy corresponds to the vertical offset between the two rows of the measurement electrodes, combining said electrodes potentials at the three depths of measurement in order to provide a virtual set of measurement electrodes wherein each electrode of the first row faces an electrode of the second row; and measuring potentials differences between electrodes of said virtual set of measurement electrodes in order to provide the set of measured points.

In a third embodiment of the method of the invention, the measured points are situated at the midpoints of each of the lines joining the measurement electrodes of one row with the adjacent electrodes of the other row.

In this case, the method further comprises the steps of measuring the potential differences between a first pair of adjacent measurement electrodes and a second pair of adjacent electrodes, wherein all of said measurement electrodes are distinct ones and each pair is constituted by a measurement electrode from one row and a measurement electrode from the other row; and interpolating said two potential differences in order to obtain a third calculated potential difference which is calculated between a pair of virtual adjacent measurement electrodes that are each situated at the midpoint of the lines joining electrodes from the first and second pairs that are situated on the same row.

Preferably, the method of the invention comprises the step of generating a resistivity image of the borehole wall based on the total electric field at each of the measured points, said measured points constituting pixels of said image.

Preferably, the method of the invention also comprises the step of determining the position and the orientation of the bed boundaries in the formation from said resistivity image of the borehole wall.

Additional objects and advantages of the invention will become apparent to those skilled in the art upon reference to the detailed description taken in conjunction with the provided figures.

Figure 4:
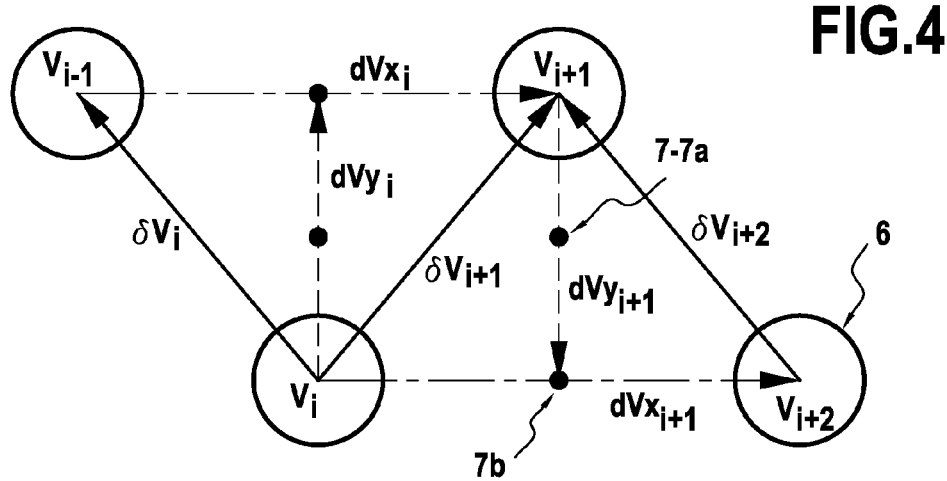
Figure 5:
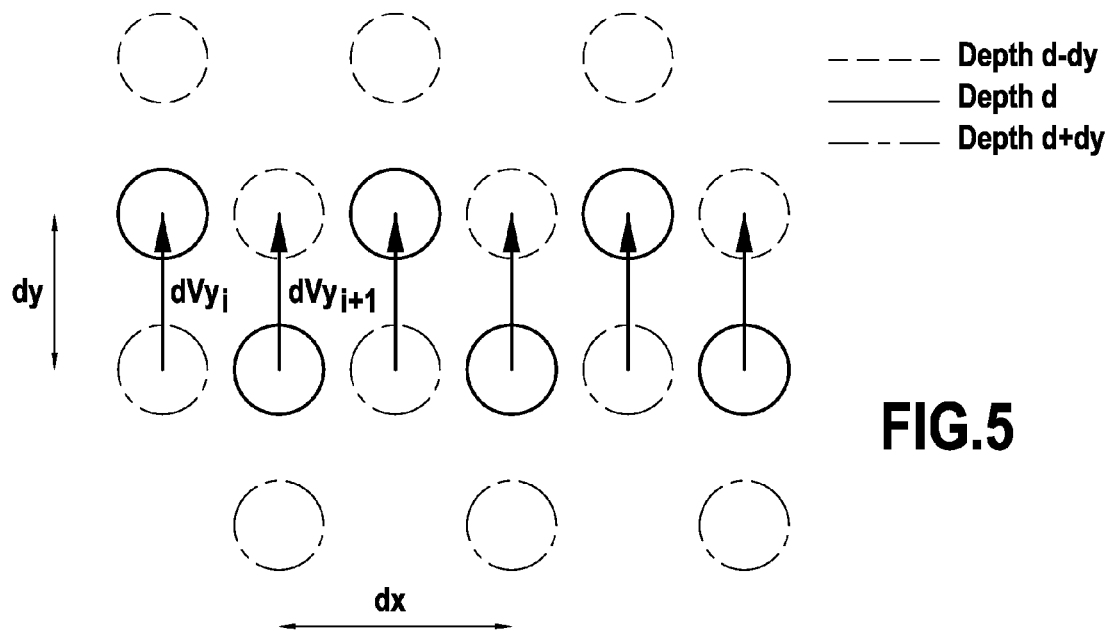
Figure 6:
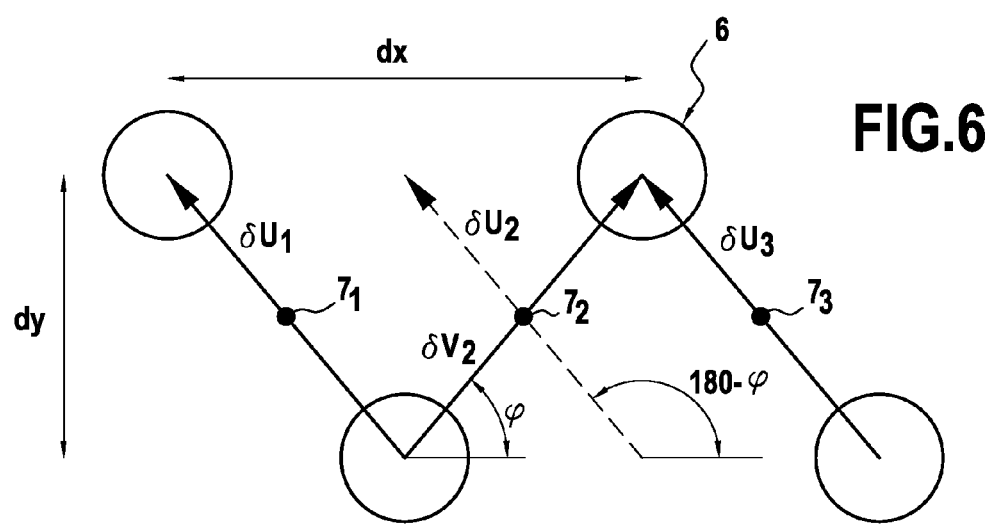
Figure 9:
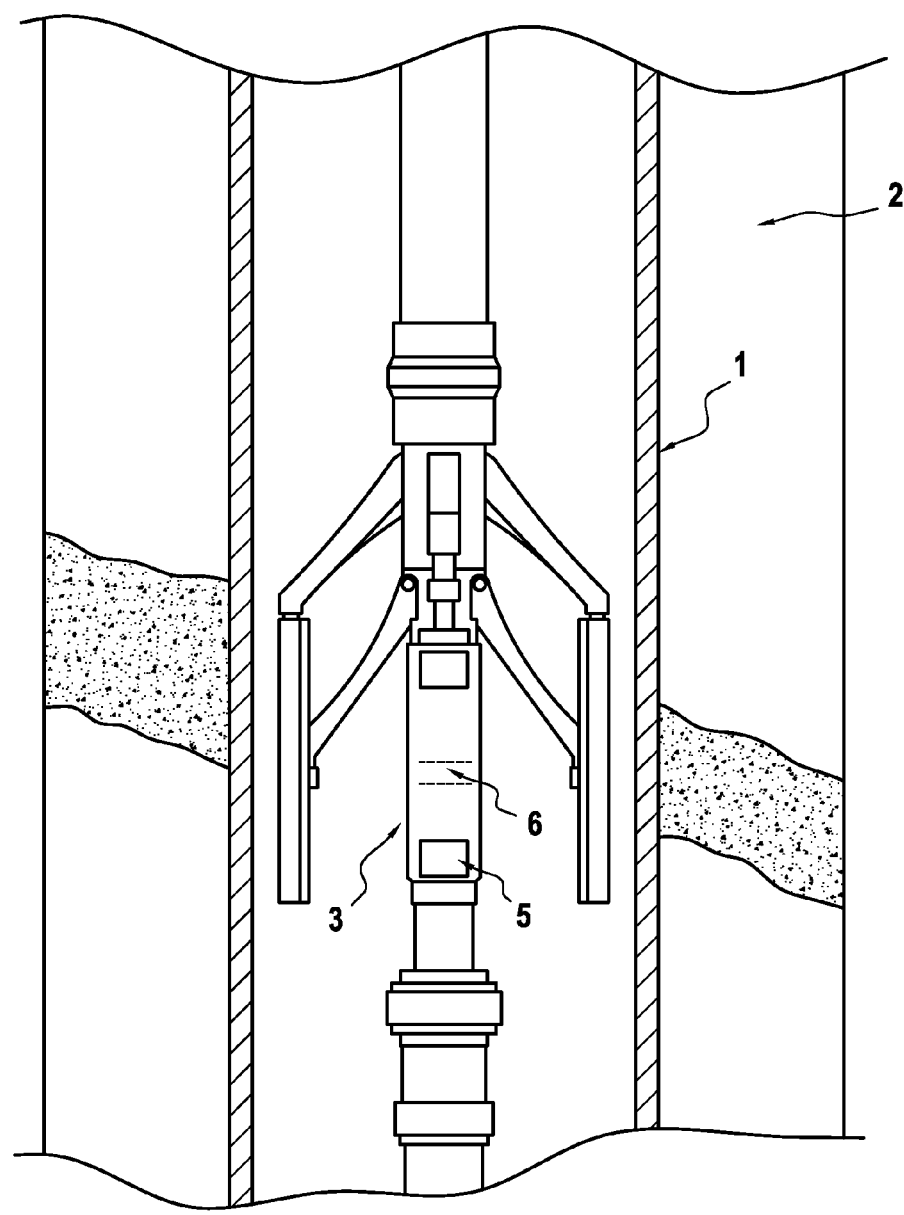

FIG. 4 schematically represents a first method of obtaining measured points with an apparatus according to the invention;

FIG. 5 schematically represents a second method for obtaining measured points with an apparatus according to the invention;

FIG. 6 schematically represents a third method for obtaining measured points with an apparatus according to the invention;

FIGS. 7 and 8 schematically illustrate a particular case when implementing an embodiment of the method of the invention;

FIG. 9 represents an example of an apparatus according to the invention while investigating the wall of a borehole.

Figure 1:
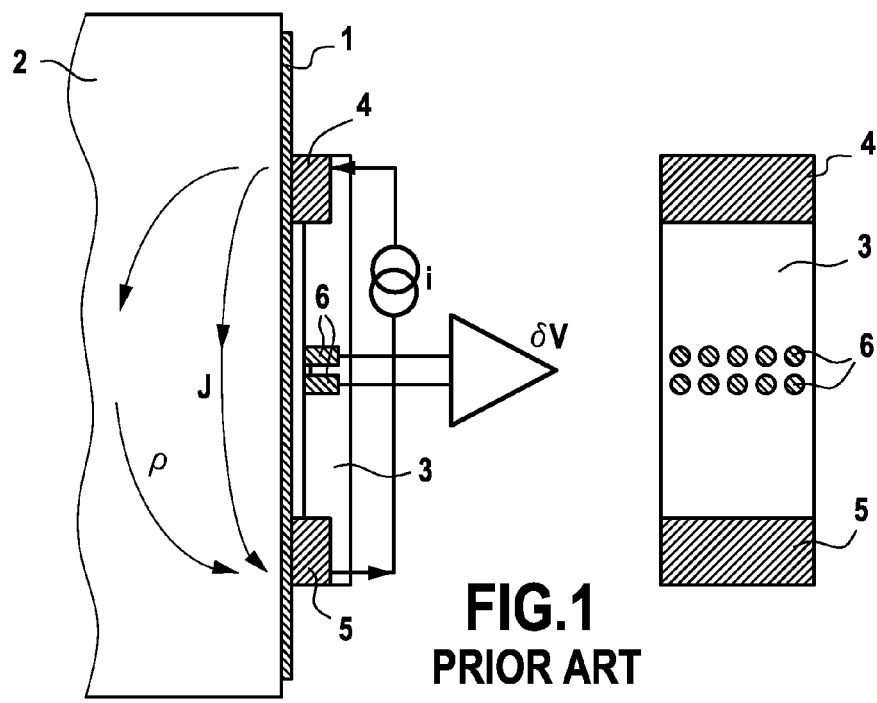
FIG. 1 represents a pad of an existing apparatus for investigating the wall of a borehole.

FIG. 1 is a diagram showing the principle on which electrical measurement is based in the imaging technique described in international patent application WO 00 04405. That apparatus is particularly adapted to investigate the wall 2 of a borehole drilled with a non-conductive drilling mud, for example a drilling fluid whose liquid phase is constituted essentially by an oil (diesel oil, synthetic oil) or by a water-in-oil emulsion. The term "oil-base mud" is used below to designate drilling fluids of either of those types. The drilling mud forms a mud layer 1 along the wall 2.

The apparatus of the prior art has a pad 3 made of an electrically insulating material such as a ceramic or polymer having high strength and high thermal and chemical stability. The pad serves as a support for two current injectors: the source electrode 4 and the return electrode 5. These two electrodes are situated at opposite ends of the pad and occupy the entire width thereof, or at least they occupy a large fraction of its width, so as to maximize the surface areas of these current injection electrodes. The central portion of the pad has two rows of measurement electrodes 6 that are pressed against the borehole wall by an arm 7. In these two rows of electrodes, each measurement electrode of the first row is situated right above a corresponding measurement electrode in the second row such that there is no horizontal offset between said first and second rows. Potential differences are calculated between a pair of facing measurement electrodes as shown on FIG. 1.

As previously explained here above, this prior art configuration suffers from various drawbacks. First, this technique is not satisfying when the bed boundaries of the formation are not horizontal, for example when the bedding is inclined significantly from the horizontal or at the highly curved boundary of a small object. Second, this solution has a poor vertical resolution considering the vertical packing of the electrodes. Third, the horizontal sampling is not ideal since there is no overlap between the measurements: each pair of measurement electrodes only helps to compute a single measured point, constituting a pixel of the resistivity image of the borehole wall.

Figure 2:
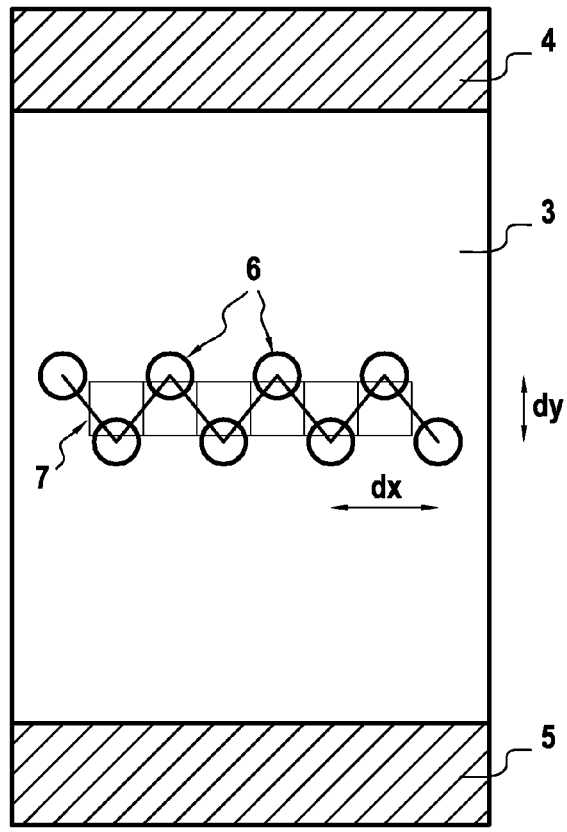
FIG. 2 represents a pad in one embodiment of an apparatus according to the invention.

FIG. 2 represents a pad 3 of an apparatus according to the invention. This pad comprises a source electrode 4 and a return electrode 5 that inject an electric current into the formation. Between these two electrodes is a set of measurement electrodes 6. As previously described here above, the pad 3 can be made out of an electrically insulating material. In another embodiment, the pad further comprises shielding means that are arranged between the source electrode and the measurement electrodes and between the measurement electrodes and the return electrode, said shielding means being flush with or almost flush with the outside face of the pad. In this case, it is possible that the pad itself constitutes the shielding means, said pad being made out of electrically conductive material.

In order to reduce the vertical offset between the measurement electrodes to its minimum, it has been decided to make any measurement electrode participate to at least the computation of two measured points 7, i.e. two pixels of the resistivity image of the formation wall. Therefore, as it can be seen on the drawing, the set of the measurement electrodes 6 is composed of two substantially horizontal rows of measurement electrodes, these rows being horizontally offset from each other such that the set of measurement electrodes looks approximately as a zigzag set. The horizontal offset between the two rows allows reducing the vertical distance dy between the measurements electrodes, which improves the vertical resolution of the measurements.

Good results have been obtained for a horizontal offset (dx) between the two rows of measurement electrodes of approximately 0.16 inch (0.41 cm). Common vertical offset (dy) between the two rows of measurement electrodes is approximately also 0.20 inch (0.51 cm). Advantageously, the zigzag array comprises 22 measurement electrodes (11×2) and makes 21 diagonal potential difference measurements.

Figure 3A:
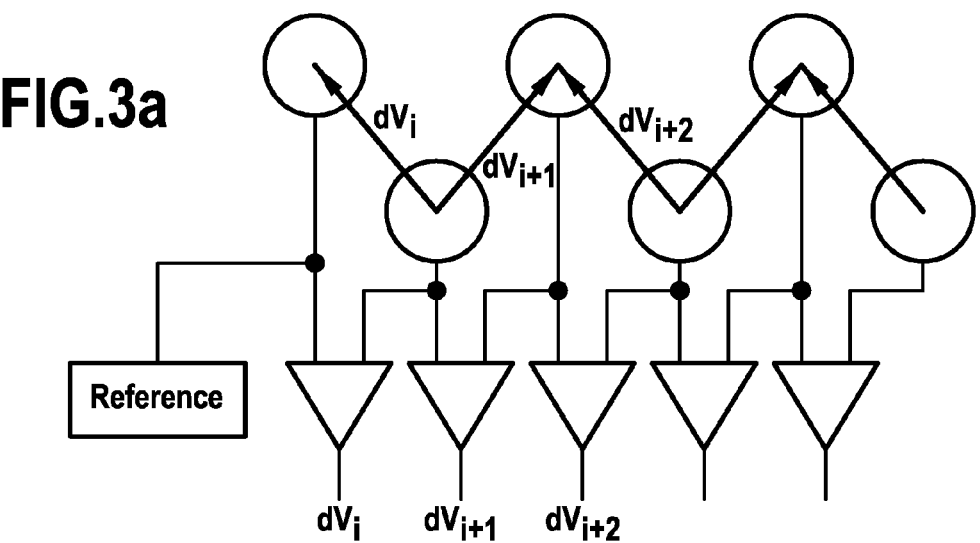
FIGS. 3a to 3c represent arrangements of amplifiers in an apparatus according to the invention.
Figure 3B:
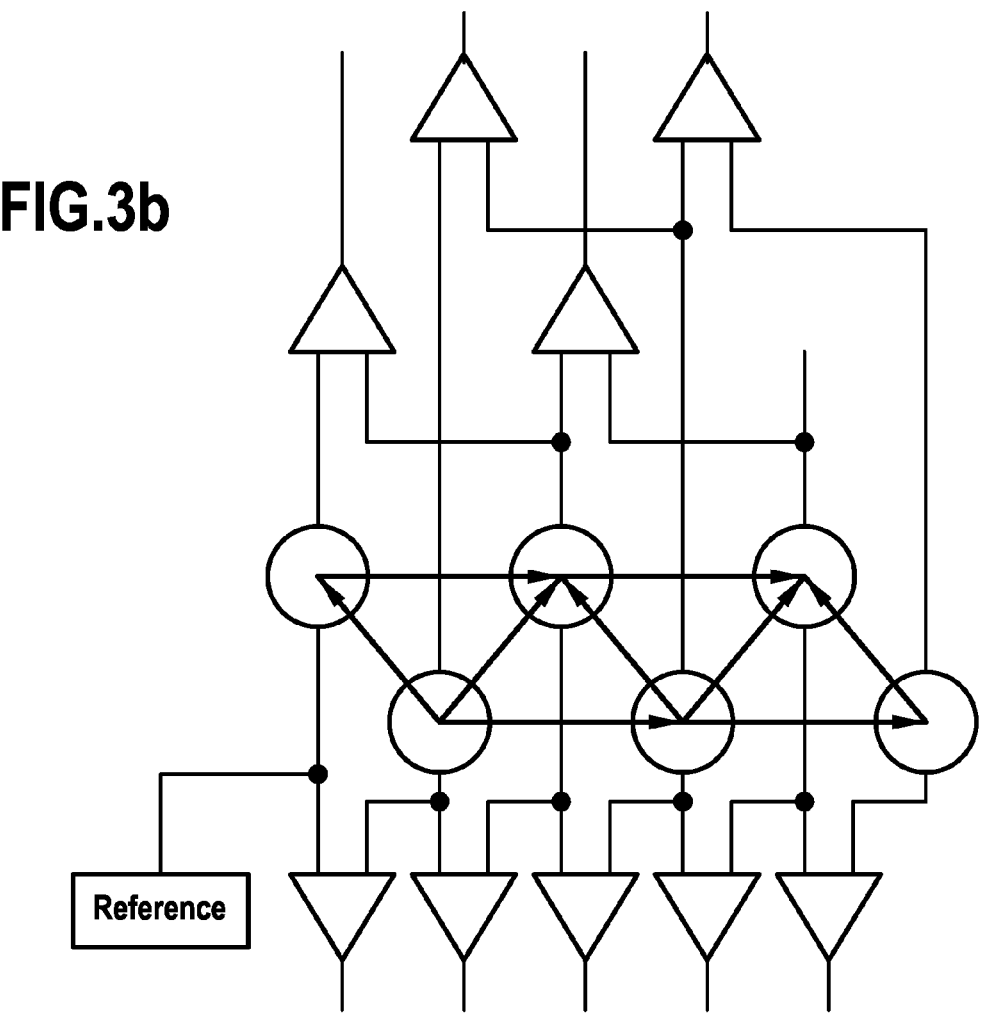
Figure 3C:
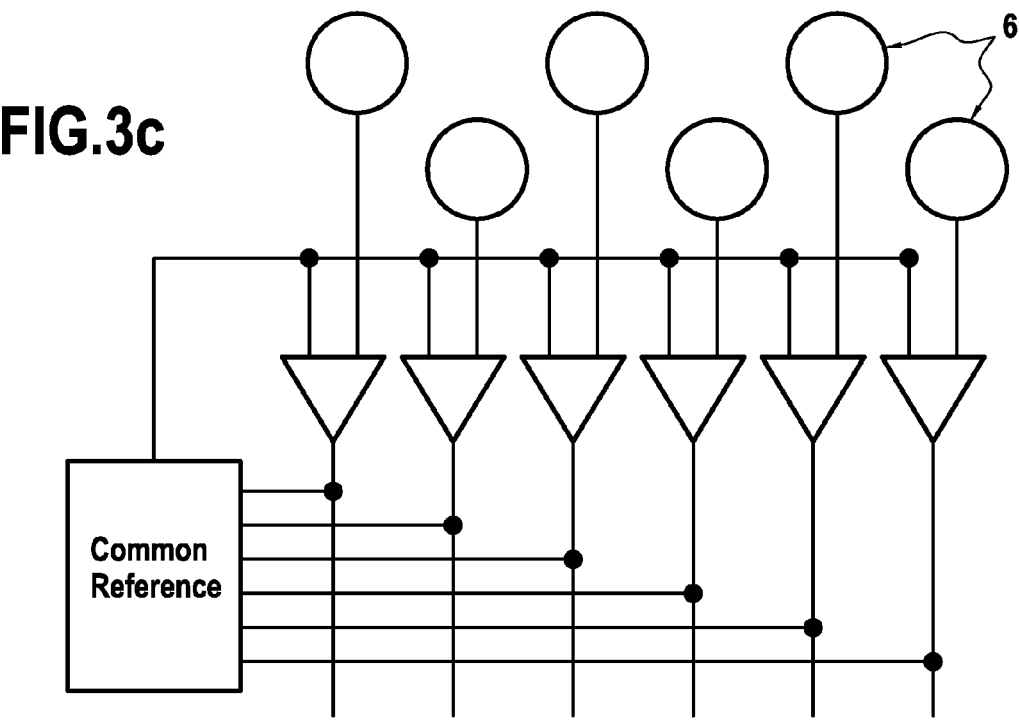

Not shown on FIG. 2, each measurement electrode 6 is connected to voltage-measuring means for measuring said potential differences between said measurement electrodes. Three arrangements using differential amplifiers are shown in FIGS. 3a to 3c. First, on FIG. 3a, the potential differences can be measured in diagonal directions. Second, FIG. 3b, in order to provide redundancy the potential differences can be measured in three directions. Third, on FIG. 3c, the potentials of the measurement electrodes can be measured relative to a common reference, preferably the mean electrode potential, and the potential differences between measurement electrodes can be calculated by separate signal processing. As it is known in the art, the outputs of these amplifiers may be sampled in parallel or sequentially and A/D converted by sampler/converter blocks. In turn, the output of the block is preferably processed by signal processing means. These means generate a resistivity image of the borehole wall based on pixels, i.e. the computed measured points 7.

FIG. 4 represents a first method of computing the resistivity from measurements of potential differences between the measurement electrodes using an apparatus of the invention. In this embodiment, each measured point 7 (where the resistivity of the formation is to be computed) is situated at the midpoint of the vertical median line of a triangle constituted by an elementary group of three measurement electrodes 6 among which two of them are from the same row and one of them is from the other row.

Potential differences $\delta V_i$ are measured in the diagonal directions, i.e. between adjacent measurement electrodes of the first and second row. In fact, it would also be sufficient to measure the potential difference in any two directions in each triangle of measurement electrodes because the third value can be calculated. Alternatively, all three potential differences can be measured in each triangle to provide redundancy, as previously explained.

In this case, the vertical component of the electric field is calculated as follows:

$$E_{yi} = dVy_i = (V_{i-1} + V_{i+1})/2 - V_i = (\delta V_{i+1} + \delta V_i)/2 \quad (1)$$

where $dVy_i$ is the computed vertical dV, $V_i$ etc. are the potentials at each measurement electrodes 6, and $\delta V_i$ and $\delta V_{i+1}$ are the measured diagonal $\delta V$'s potential differences. The resistivity at a measured point 7 in the center of each triangle is proportional to $dVy_i$.

Therefore, if the total electric field is vertical the resistivity is given by:

$$\rho_i = A \cdot Ey_i / I \quad (2)$$

where A is a geometrical factor depending on the separation of the source and return electrodes 4 and 5, and I is the current passing through the formation.

This method provides n resistivity measured points using n+2 measurement electrodes with n+1 potential differences measurements. Compared to a prior art two-row in-line array with the same size and number of measurement electrodes, this arrangement almost doubles the horizontal measurement sampling and it also reduces the vertical separation of the electrodes, thus improving the vertical resolution.

When the bed boundaries are inclined with respect to the horizontal, the electrical current flowing in the formation is deviated from the vertical. In such case, it is desirable to calculate the total electric field as a vector, rather than just the vertical component. Using the total field improves the signal-to-noise ratio and localizes the boundaries more precisely. Knowing the direction of the field and the orientation of the bed boundaries allows further analysis that can improve the accuracy of the resistivity measurement.

Therefore, according to the method for investigating the formation wall of the invention, a horizontal component of the electric field will be added to the vertical component.

The horizontal component of the electric field is given by:

$$E_{xi} = dVx_i/dx \quad (3)$$

where $dVx_i$, the potential difference in the horizontal direction is given by $$dVx_i = V_{i+1} - V_{i-1} = \delta V_{i+1} - \delta V_i \quad (4)$$

The total field is the vector sum of the horizontal and vertical components. However, it can be seen from FIG. 4 that the two components are measured at different places. The vertical component 7a is measured at the midpoint of the vertical median line (i.e. at the same place than the computed measured point 7), whereas the horizontal component 7b is measured at the center of the horizontal side of the triangle. Therefore, successive horizontal components are vertical displaced by $+dy/2$, $-dy/2$, $+dy/2$ etc. compared to the vertical components and must be depth shifted before calculating the total field.

If it is assumed that the current is constant between depths $+/-dy/2$ (a reasonable assumption in view of the large size of the current injection electrodes compared to the vertical offset of the rows $dy$) the total field is calculated as $$\underline{E}_i = Ey_i + Ex_i(\text{depth}+/-dy/2) \quad (5)$$

where the underbar indicates vector notation.

The resistivity for each measured point 7, at the i position (let's note it $7_i$) is thus given by:

$$\rho_i = A.|\underline{E}_i|/I \quad (6)$$

where $|\underline{E}_i|$ is the magnitude of the vector $\underline{E}_i$.

In fact, the current can vary between depths $+/-dy/2$ owing to rugosity or pad liftoff or changes in the applied current from the electronics. E is proportional to I at any fixed position so E will change if I changes. For an accurate calculation of the total field and resistivity, it is preferable to normalize the field components relative to the currents at the depth of measurement as follows:

$$\underline{E}_i/I = Ey_i/I + Ex_i(\text{depth}+/-dy/2)/I(\text{depth}+/-dy/2) \quad (7)$$

FIG. 5 represents a second embodiment of the method according to the invention. The calculation of the vertical component in equation (3) involves a linear interpolation between $V_{i-1}$ and $V_{i+1}$. To avoid this interpolation and hence improve the horizontal resolution of the vertical component, it is possible to combine measurements made at three depths separated by the vertical electrodes offset $dy$, in order to create a virtual array as illustrated in FIG. 5.

The method includes measuring the measurement electrodes potentials using either of the three methods that have been previously explained. This method further includes the following steps:

calculate the normalized values $V_i/I$ to allow for varying current between depths.

calculate the mean value of $V_i/I$ of both the upper and lower electrodes rows separately relative to the reference.

redo the previous steps at three depths $d+dy$, $d$ and $d-dy$, separated by the vertical offset $dy$. In FIG. 5 the buttons at depth $d-dy$ are shown dashed, those at depth $d$ are full and those at depth $d+dy$ are dotted.

Then, it has to be added a constant to the $V_i/I$ values at depth $d+dy$ in order to set the mean V/I value of the upper row at depth $d+dy$ equal to the mean V/I of the lower row at depth $d$. Furthermore, a constant is added to the $V_i/I$ values at depth $d-dy$ in order to set the mean V/I value of the lower row at depth $d-dy$ equal to the mean value of the upper row at depth $d$. These two steps create two virtual rows of measurement electrodes with a horizontal offset of $dx/2$ and a vertical offset of $dy$. In this embodiment, these virtual rows are such that each measurement electrodes of the first row faces a measurement electrode of the second row.

Then, according to this embodiment, the vertical differences $dVy_i/I$ are calculated between the calculated $V_i/I$ values in the two rows created by combination of the measurements. Then the normalized electric field is calculated as follows:

$$Ey_i/I = dVy_i/(I.dy) \quad (8)$$

The horizontal component of normalized electric field is calculated in the same way as explained in reference to the first embodiment of the method according to the invention. Then, in a first example, this horizontal component is depth shifted before being vectorial added to the vertical component. In this case, each measured point faces each measurement electrode and is vertically offset from said measurement electrode by one half of the vertical offset $dy$ between two rows. In a second example, it is the vertical component of the electric field that is depth shifted to the level of the horizontal component before being added vectorial to said horizontal component. In this case, each measured point is situated at the position of each measurement electrode.

The embodiment creates an image sampled vertically at the measurement electrodes vertical offset $dy$, which represents the vertical resolution. In accordance with conventional sampling theory, it is preferable to sample vertically at a spacing of $dy/2$ or less. If the vertical sampling is $dy/2$, two independent interleaved sets of measurements are created. The first set is at depths $d$, $d-dy$, $d-2dy$, etc and the second set is at $d-dy/2$, $d-3dy/2$, etc where d is the depth where the log starts.

In the preferred third embodiment of a method according to the invention, as schematically explained in reference to FIG. 6, the components of the electric field in two different directions are determined at the measure points situated on the midpoint of each line joining two adjacent measurement electrodes situated on different rows. These allow the vertical and horizontal components of the electric field, and hence the total electrical field, to be determined at the measured points.

The potential differences between two adjacent measurement electrodes situated on different rows are measured. Each potential difference gives essentially the electric field in the direction of the line joining the adjacent electrodes.

Going across the array, the direction of the measurement alternates between $\phi$ and $180-\phi$ where $\phi = \tan^{-1}(2dy/dx)$. $\delta V_i$ and $\delta U_i$ respectively represent the potential differences in the $\phi$ and $180-\phi$ directions at each of the measured point $7_i$, whether or not there is a direct measurement of said potential difference.

As it can be seen on FIG. 6 for the measured point $7_2$ where $\delta V_i$ ($\delta V_2$) is measured directly by the potential measuring means of the apparatus of the invention, there is no measurement of $\delta U_i$ ($\delta U_2$). However, a value for $\delta U_2$ can be obtained from the direct measurements $\delta U_{i-1}$ ($\delta U_1$) and $\delta U_{i+1}$ ($\delta U_3$) at adjacent measured points $7_1$ and $7_3$ respectively by an interpolation method described below.

The total field $\underline{E}_i$ (i.e. its x- and y-components $E_{xi}$ and $E_{yi}$) at the measured point $7i$ can then be calculated from:

$$\delta V_i = D(\cos\phi Ex_i + \sin\phi Ey_i) = Ex_i dx/2 + Ey_i dy \quad (9)$$

and $$\delta U_1 = D(-\cos\phi Ex_i + \sin\phi Ey_i) = Ey_i dy - Ex_i dx/2 \quad (10)$$

where D is the diagonal distance between adjacent measurement electrodes of different row.

This gives:

$$Ex_i = (\delta V_i - \delta U_i)/dx \quad (11)$$

$$Ey_i = (\delta V_i + \delta U_i)/2dy \quad (12)$$

from which $|\underline{E}_i|$ can be obtained as $\sqrt{(Ex_i^2 + Ey_i^2)}$.

Similarly, if at some other measured point $7_i$ there is no direct measurement for $\delta V_i$, an interpolated value can be obtained from the neighboring direct measurements $\delta V_{i-1}$ and $\delta V_{i+1}$. In this way, the total electric vector field can be obtained at all at the midpoints of each of the lines joining the measurement electrodes of one row with the adjacent electrodes of the other row.

This preferred method according to the invention thus requires $\delta U_i$ to be obtained from $\delta U_{i-1}$ and $\delta U_{i+1}$ by interpolation. If the electric field is roughly constant in the neighborhood of measured point i, $\delta U_i$ can be obtained from $\delta U_{i-1}$ and $\delta U_{i+1}$ by a simple arithmetic average. If a boundary between two beds of the formation, with large resistivity contrast, is close by, the electric field will not be constant, as illustrated in FIG. 7. In FIG. 7, the grey lines represent the lines of current flow in the neighborhood of a bed boundary AB between a low-resistivity material below and a high-resistivity material above. The dashed black lines trace the paths of the measured points 1, 2, 3 as the pad moves vertically upward across the boundary. In this case, the simple average will not work.

On the FIG. 8, the plain lines represent the curves of $\delta U_{1,2,3}$ that would be measured at these measured points according to Ohm's law:

$$\delta U = D(-\cos\phi\rho Jx + \sin\phi\rho Jy) = Ey_i dy - Ex_i dx/2 \quad (13)$$

where $\rho$ is the resistivity and Jx and Jy are the current density in the x- and y-directions. The dash line is the arithmetic average of $\delta U_1$ and $\delta U_3$. It is clear that this latter is a poor approximation to the $\delta U_2$ curve.

In such conditions, an interpolation step, based on a depth matching principle will provide better results. With reference to FIG. 8, this interpolation step will find corresponding points between $\delta U_1$ and $\delta U_3$, leading to the $\delta U_2$ plain curve.

While this interpolation step would obviously work for linear boundaries, it has a much more general applicability. Since the above procedure interpolates between two curves at a distance dx (horizontal offset between two rows) apart, it will give a good result whenever the edge of an inhomogeneity is well approximated by a straight line over the distance dx, which is typically a few millimeters.

In case the current varies between the depths where the matching is done, the fields should be divided by the current before performing the above procedure as already explained here above.

FIG. 9 represents an example of a borehole wherein the formation resistivity is measured using an apparatus according to the invention. According to the method of the invention, each pad 3 of the apparatus is pressed against the mud layer 1 covering the borehole wall. Then the current 4 and return 5 electrodes inject a current into the formation 2. The potential differences are measured between the measurement electrodes 6 as explained in one of the embodiments according to the method of the invention, said potential differences being representative of the formation resistivity.

The apparatus of the invention and the associated method of investigating the wall of a borehole filled with non-conductive mud have many advantages. First, compared to the conventional two-row arrangement, the zigzag arrangement makes a closer vertical packing of the electrodes, improving the vertical resolution. Second, compared to the prior art three-row arrangement, the zigzag arrangement has half the effective vertical button spacing (twice the vertical resolution) while using two-thirds of the number of buttons. Third, since each button must have its own high-impedance buffer amplifier mounted very close to it, the zigzag array is much easier to implement practically than the three-row array.

Finally, the use of the total field improves the precision of the image. It is also possible to display resistivity images made using a component of the field in any direction, for example the vertical or horizontal component of the field, or the direction perpendicular to bed boundaries locally (these having been determined by conventional image analysis). Using the horizontal component may aid bed boundary detection in highly deviated wells where boundaries are almost parallel to the wellbore. Using the field perpendicular to bed boundaries provides a more accurate resistivity contrast and also allows discrimination against features such as small cracks that are not aligned with the beds.

The invention claimed is:

1. An apparatus for investigating the wall of a borehole filled with non-conductive mud, said apparatus comprising:
  a pad having an inside face and an outside face for pressing against the wall of the borehole;
  a set of measurement electrodes mounted on the outside face of the pad, potentials differences being measured between said measurement electrodes in order to provide measured points representative of the resistivity of the formation;
  both a source electrode and a return electrode adapted to inject current into the formation, the set of measurement electrodes being situated between the source electrode and the return electrode;
  wherein the set of measurement electrodes comprises two substantially horizontal rows of electrodes, said two rows being horizontally offset from each other, such that the potentials differences measured between said measurement electrodes are representative of both the vertical component and the horizontal component of the total electric field in the formation at each measured point.

2. The apparatus according to claim 1, wherein each measured point is situated at the midpoint of the vertical median line of a triangle constituted by an elementary group of three measurement electrodes among which two of them are from the same row and one of them is from the other row of measurement electrodes.

3. The apparatus according to claim 1, wherein each the measured point is situated at the position of each measurement electrode.

4. The apparatus according to claim 1, wherein each measured point faces each measurement electrode and is vertically offset from said measurement electrode by one half of the vertical offset between said two rows.

5. The apparatus according claim 1, wherein the measured points are situated at the midpoints of each of the lines joining the measurement electrodes of one row with the adjacent electrodes of the other row.

6. The apparatus according to any preceding claim 1, wherein the pad is made out of non-conductive material.

7. The apparatus according to any one of claim 1, wherein the pad further comprises shielding means which are arranged between the source electrode and the measurement electrodes and between the measurement electrodes and the return electrode, said shielding means being flush with or almost flush with the outside face of the pad.

8. The apparatus according to claim 7, wherein the pad itself constitutes the shielding means, said pad being made of electrically conductive material.

9. The apparatus according to any preceding claim 1, further comprising voltage-measuring means coupled to said set of measurement electrodes for measuring said potential differences between said measurement electrodes.

10. The apparatus according to claim 9, further comprising signal processing means coupled to said set of measurement electrodes for generating a resistivity image of the borehole wall based on potential differences measured by said voltage measuring means.

11. The apparatus according to claim 10, wherein each measured point constitutes a pixel of the resistivity image of the borehole wall.

12. The apparatus according to any preceding claim 1, wherein the vertical offset and the horizontal offset between said two rows of measurement electrodes are substantially of a fifth of an inch.

13. Method for investigating the wall of a borehole in a geological formation wherein a borehole filled with non-conductive mud passes, the method comprising:
pressing a pad against the borehole wall, said pad comprising a current electrode and a return electrode;
generating a current to flow into the formation via said current electrode and said return electrode between which a potential is applied;
measuring potential differences between measurement electrodes that are situated on the outside face of the pad between the current electrode and the return electrode;
providing from said potential differences a set of measured points that are representative of the resistivity of the borehole wall;
said method further comprising:
arranging said measurement electrodes in two rows that are substantially horizontal and horizontally offset from each other;
deducing from said potentials differences the vertical component and the horizontal component of the electric field in the formation at each measured point;
summing said vertical and horizontal components in order to provide the total electric field in the formation at each measured point.

14. The method according to claim 13, wherein each measured point is situated at the midpoint of the vertical median line of a triangle constituted by an elementary group of three adjacent measurement electrodes among which two of them are from the same row and one of them is from the other row of measurement electrodes.

15. The method according to claim 14, further comprising:
calculating the horizontal and vertical components of the electric field generated in each elementary group of three adjacent measurement electrodes;
depth shifting the horizontal component of said electric field to the level of the vertical component;
summing the said two components vectorial in order to obtain the total electric field in each of said group of three adjacent measurement electrodes.

16. The method according to claim 15, wherein the vertical component of the electric field is measured at the midpoint of the vertical median line of the triangle formed by the elementary group of three adjacent measurement electrodes.

17. The method according to claim 16, wherein the vertical component of the total electric field is given by:
$E_{yi}=dVy_i=(V_{i-1}+V_{i+1})/2-V_i=(\delta V_{i+j}+\delta V_i)/2$ where $dVy$ is the computed vertical potential difference, $V_i$ etc. are the potentials at each measurement electrodes, and $\delta V_i$ and $\delta V_{i+1}$ are the measured potential differences between said adjacent measurement electrodes.

18. The method according to any one of claim 15, wherein the horizontal component of the electric field is measured at the center of the horizontal side of the triangle constituted by the elementary group of three adjacent measurement electrodes.

19. The method according to claim 18, wherein the horizontal component of the total electric field is given by:
$E_{xi}=dVx_i/dx$ where $dVx_i$ is the computed potential difference in the horizontal direction and is given by $dVx_i=V_{i+1}-V_{i-1}=\delta V_{i+1}-\delta V_i$, where $V_i$, etc. are the potentials at each measurement electrodes, and $\delta V_i$ and $\delta V_{i+1}$ are the measured potential differences between said adjacent measurement electrodes.

20. The method according to claim 13, further comprising:
measuring the measurement electrodes potentials of the two rows relative to a reference for a first measurement depth d;
repeating the measurement of the measurement electrodes potentials for the two rows at a second and at a third measurement depths, said second and third depths being respectively spaced from the first measurement depth by d+dy and d−dy , wherein dy corresponds to the vertical offset between the two rows of the measurement electrodes,
combining said electrodes potentials at the three depths of measurement in order to provide a virtual set of measurement electrodes wherein each electrode of the first row faces an electrode of the second row; and
measuring potentials differences between electrodes of said virtual set of measurement electrodes in order to provide the set of measured points.

21. The method according to claim 13, wherein the measured points are situated at the midpoints of each of the lines joining the measurement electrodes of one row with the adjacent electrodes of the other row.

22. The method according to claim 21, further comprising:
measuring the potential differences between a first pair of adjacent measurement electrodes and a second pair of adjacent electrodes, wherein all of said measurement electrodes are distinct ones and each pair is constituted by a measurement electrode from one row and a measurement electrode from the other row;
interpolating said two potential differences in order to obtain a third calculated potential difference which is calculated between a pair of virtual adjacent measurement electrodes that are each situated at the midpoint of the lines joining electrodes from the first and second pairs that are situated on the same row.

23. The method according to claim 22, wherein the horizontal and vertical components of the total electric field are respectively given by:

$Ex_i = (\delta V_i - \delta U_i)/dx$, and $Ey_i = (\delta V_i + \delta U_i)/2dy$ where $\delta V_i = D(\cos \phi\, Ex_i + \sin \phi\, Ey_i) = Ex_i\, dx/2 + Ey_i\, dy$, and $\delta U_i = D(-\cos \phi Ex_i + \sin \phi Ey_i) = Ey_i dy - Ex_i dx/2$ where D is the diagonal distance between adjacent measurement electrodes of different row, dy and dx are respectively the vertical arid horizontal offsets between the two rows of measurement electrodes and $\phi$ is the direction of the measurement of the potential differences between adjacent measurement electrodes.

24. The method according to any one of claim 13, further comprising:
  generating a resistivity image of the borehole wall based on the total electric field at each of the measured point, said measured points constituting pixels of said image.

25. The method according to claim 24, further comprising:
  determining the position and the orientation of the bed boundaries in the formation from said resistivity image of the borehole wall.

* * * * *